(12) United States Patent
Kramer et al.

(10) Patent No.: US 10,166,751 B2
(45) Date of Patent: Jan. 1, 2019

(54) METHOD FOR ENHANCED ADDITIVE MANUFACTURING

(71) Applicant: Lawrence Livermore National Security, LLC, Livermore, CA (US)

(72) Inventors: Kevin J. Kramer, Pleasanton, CA (US); Andrew Bayramian, Manteca, CA (US); Bassem S. El-Dasher, Livermore, CA (US); Joseph C. Farmer, Tracy, CA (US); John C. Post, Livermore, CA (US); James A. Demuth, Mountain View, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 652 days.

(21) Appl. No.: 14/303,642

(22) Filed: Jun. 13, 2014

(65) Prior Publication Data

US 2014/0367894 A1 Dec. 18, 2014

Related U.S. Application Data

(60) Provisional application No. 61/835,125, filed on Jun. 14, 2013.

(51) Int. Cl.
  *B32B 9/00* (2006.01)
  *B32B 15/04* (2006.01)
  (Continued)

(52) U.S. Cl.
  CPC ............ *B33Y 10/00* (2014.12); *B23K 26/323* (2015.10); *B23K 26/342* (2015.10); *B23K 26/356* (2015.10); *B32B 9/007* (2013.01); *B32B 15/043* (2013.01); *B32B 15/08* (2013.01); *C04B 35/522* (2013.01); *C04B 35/565* (2013.01); *B32B 2605/00* (2013.01); *B33Y 99/00* (2014.12); *C04B 2235/6026* (2013.01)

(58) Field of Classification Search
  None
  See application file for complete search history.

(56) References Cited

U.S. PATENT DOCUMENTS 5,837,960 A * 11/1998 Lewis .................... B23K 26/34
                                              219/121.63
7,509,738 B2 * 3/2009 Adams .................. F16K 25/005
                                              251/359

(Continued)

*Primary Examiner* — Benjamin A Schiffman
(74) *Attorney, Agent, or Firm* — Harness, Dickey & Pierce, PLC

(57) ABSTRACT

Systems and methods are disclosed for manufacturing a three dimensional (3D) part. In one implementation a system in accordance with the present disclosure may make use of an additive manufacturing (AM) subsystem for performing an AM operation to form the 3D part. The 3D part may be formed using a plurality of distinct material layers layered one on top of another. The system may also involve at least one of a laser peening (LP) subsystem and a High Velocity Laser Accelerated Deposition (HVLAD) subsystem. The LP subsystem may be used for laser peening a selected subquantity of the layers, to impart improved hardness to the selected subquantity of the layers and/or to the overall 3D part. The HVLAD subsystem may be used to bond at least one of the material layers to a previously laid down one of the material layers.

10 Claims, 3 Drawing Sheets

(51) Int. Cl.
    *B32B 15/08*     (2006.01)
    *B33Y 10/00*     (2015.01)
    *B33Y 99/00*     (2015.01)
    *C04B 35/52*     (2006.01)
    *B23K 26/323*     (2014.01)
    *B23K 26/342*     (2014.01)
    *B23K 26/356*     (2014.01)
    *C04B 35/565*     (2006.01)

(56)     References Cited

U.S. PATENT DOCUMENTS 9,192,056 B2 *   11/2015   Rubenchik ............... H05K 3/14
2007/0122560 A1 *   5/2007   Adams ..................... C23C 4/02
                                                                         427/523

* cited by examiner

METHOD FOR ENHANCED ADDITIVE MANUFACTURING

CROSS-REFERENCE TO RELATED APPLICATIONS

This application claims the benefit of U.S. Provisional Application No. 61/835,125, filed on Jun. 14, 2013. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for manufacturing parts from powdered material, and more particularly to systems and methods that makes use of Additive Manufacturing (AM) and one or more of laser peening and High Velocity Laser Accelerated Deposition (HVLAD) to achieve significantly improved hardness or tailored material properties of parts made with the AM process.

BACKGROUND

The statements in this section merely provide background information related to the present disclosure and may not constitute prior art.

Additive manufacturing (AM) techniques rely on a layered approach to building a metal or plastic part or component from the bottom up. Also referred to as 3D printing, additive manufacturing can be used to create extremely complex parts very quickly. A high level example of an AM system is shown in FIG. 1 being used to form a part one layer at a time. A heat source is used to heat each layer, typically by raster scanning the heat source back and forth across sections of the layer. The heat source melts the powdered material forming the layer and then a subsequent layer of powdered material is laid down and heated. These operations are alternately repeated for the layers L1-L8 and the resulting finished part is thus made up of a plurality of layers, one melted on top of the previous one. Thus, a part made from the AM process is typically constructed of a large plurality of distinct layers of material.

With the AM process, however, material strength and hardness of the finished part may sometimes not be as high as one would like or need. In many instances parts made from the AM process will be somewhat fragile. This may lead to inadvertent damage of the part during subsequent handling, testing or other use of the AM produced part. The AM process is also limited by the ability of the heat source being used to melt the powdered material. As a result, parts made from the AM process usually are made from a single type of material.

Other technologies exist for peening or hardening various materials. For example, laser peening is the process of hardening or peening metal using a laser. Laser peening can impart a layer of residual compressive stress on a surface that is several times deeper than that attainable from conventional shot peening treatments. Short pulses of laser energy are focused and repositioned as needed during the laser peening process, and the process is repeated over the surface being worked on. The process may be repeated two or more times until a desired compression level is reached, thus producing a compressive layer of a desired depth in the material surface. Laser peening is highly effective in improving the fatigue resistance of metal parts.

High Velocity Laser Accelerated Deposition (HVLAD) technology for controlled laser-driven explosive bonding is a state-of-the-art proprietary methodology developed by Lawrence Livermore National Laboratory. This state-of-the-art process is enabled and facilitated by LLNL's high-performance solid-state laser technology. With HVLAD technology, a coating of a dissimilar material may be deposited on and bonded to a substrate. A high power laser pulse hits the film of deposited material covered by a thin water layer. The laser deposition on the water-material interface generates a large pressure accelerating film to velocities of a few hundred meters per second. The film hits the substrate at an oblique angle. The high velocity of impact induces the plastic flow of materials on the film-substrate interface. Shear flow, due to the oblique incidence, results in material mixing and extremely strong coating adhesion.

The HVLAD process uses powerful and high repetition rate production lasers for localized explosive bonding, thus producing a very broad range of advanced high-temperature and corrosion-resistant coatings with extreme interfacial bond strength. These interfacial bonds approach the ultimate tensile strength of the substrate. The deposition of protective metallic films and coatings on various metallic alloy, ceramic or composite substrates is important for many industrial applications. LLNL has now demonstrated that exceptionally high corrosion resistant and high wear resistant coatings can be deposited on a substrate material with exceptional interfacial bond strengths approaching the ultimate strengths of the underlying substrate materials. The HVLAD process may be conducted in a variety of manufacturing settings such as plants, aircraft hangers, ship yards, etc., under ambient conditions.

Accordingly, a need still exists to significantly improve the strength, hardness and other properties of parts made using the AM process by using one or more available technologies which, up to the present time, have not been integratable with the AM process.

SUMMARY

In one aspect the present disclosure relates to a system for manufacturing a three dimensional part. The system may comprise an additive manufacturing (AM) subsystem for performing an AM manufacturing operation. The AM manufacturing operation may be used to form the three dimensional part using a plurality of distinct material layers layered one on top of another. The system may include at least one of, or both of, a laser peening subsystem and a High Velocity Laser Accelerated Deposition (HVLAD) subsystem. The laser peening subsystem may be used for laser peening a selected subquantity of the layers to impart improved hardness to the subquantity of the layers, and thus to the overall three dimensional part. The HVLAD subsystem may be used to bond at least one of the material layers to a previously laid down one of the material layers.

In another aspect the present disclosure relates to a method for manufacturing a three dimensional part. The method may comprise using an additive manufacturing (AM) process to form the three dimensional part using a plurality of distinct material layers layered one on top of another. At least one of the following operations may also be used when performing the method: a laser peening operation in which a selected subquantity of the material layers is laser peened to impart improved hardness to the subquantity of the material layers; and an operation by which a new quantity of material, which forms a new material layer, is bonded to a previously laid down one of the material layers using a High Velocity Laser Accelerated Deposition (HV-LAD) process.

In still another aspect the present disclosure relates to a method for manufacturing a three dimensional part. The method may comprise using an additive manufacturing (AM) process to form the three dimensional part using a plurality of distinct material layers layered one on top of another. A bonding operation may also be used to bond a new quantity of material, to form a new material layer, on a previously laid down one of the material layers. The bonding operation may be performed using a High Velocity Laser Accelerated Deposition (HVLAD) process.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
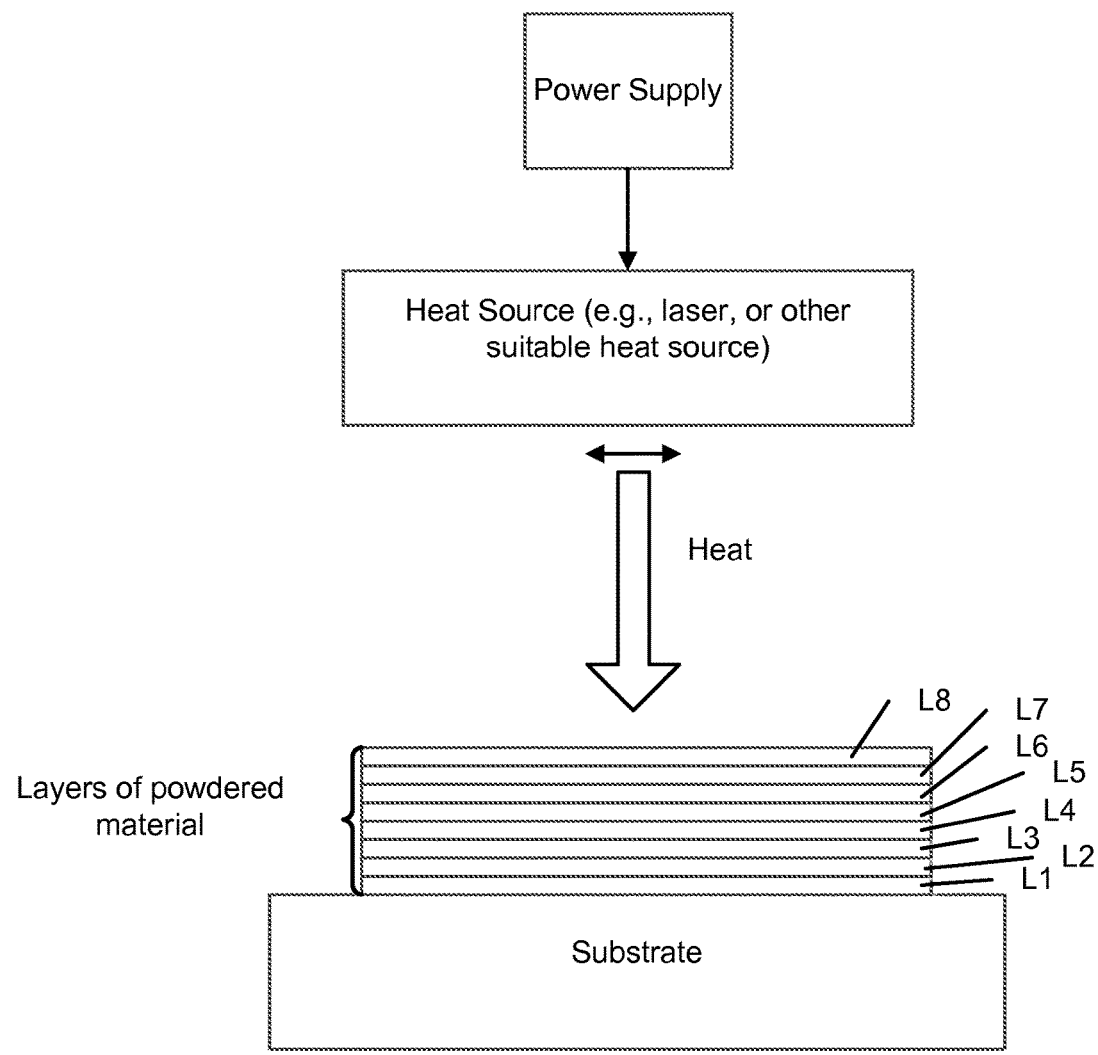
FIG. 1 is a high level prior art illustration of a prior art Additive Manufacturing (AM) process being used to sinter a plurality of layers of homogeneous material to form a part.

The following description is merely exemplary in nature and is not intended to limit the present disclosure, application, or uses. It should be understood that throughout the drawings, corresponding reference numerals indicate like or corresponding parts and features.

Figure 2:
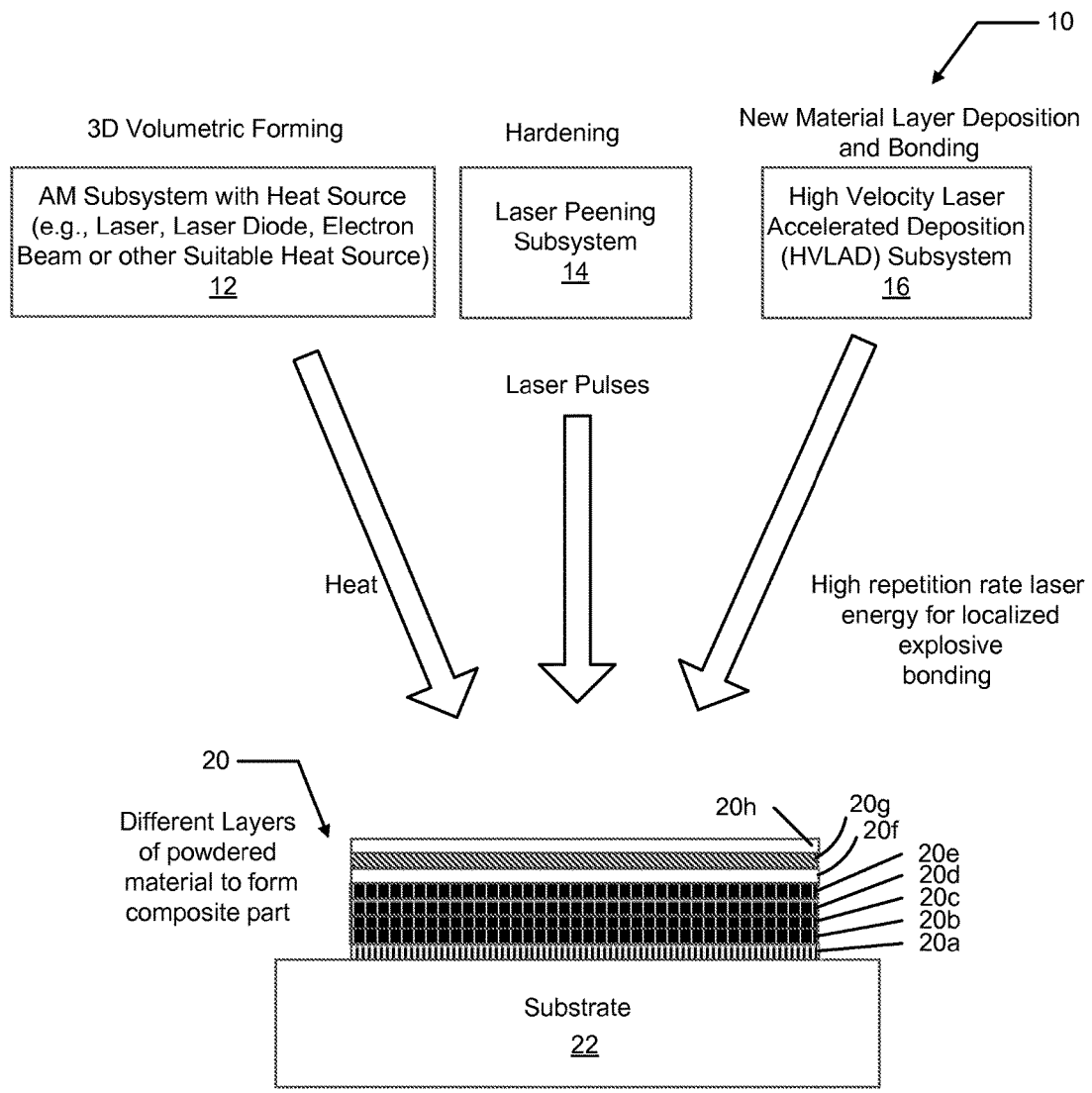
FIG. 2 is a high level illustration of a system in accordance with one embodiment of the present disclosure in which a laser peening subsystem and a HVLAD subsystem are both used to enhance and augment the AM process to produce a composite part having layers of different types of material, and with overall significantly increased hardness and additional material properties present in the finished part.

Referring to FIG. 2, there is shown a system 10 in accordance with one embodiment of the present disclosure. The system makes use of a 3D volumetric manufacturing subsystem and process, in this example an Additive Manufacturing (AM) subsystem 12, as well as one or more of a Laser Peening subsystem 14 and a High Velocity Laser Accelerated Deposition (HVLAD) subsystem 16. It will be appreciated that the AM subsystem 12 could be implemented through a laser diode based AM system such as disclosed in U.S. application Ser. No. 13/785,484, filed Mar. 5, 2013, on behalf of Lawrence Livermore National Laboratory, and assigned to Lawrence Livermore National Security LLC, the entire disclosure of which is hereby incorporated by reference into the present disclosure. Virtually any other type of heat source may be used to provide the heat needed to melt material layers 20a-20h, however in many instances it is expected that the heat source will be a laser. Merely for convenience, the following discussion will make reference to a laser as being the heat source being used with the AM subsystem 12.

The layers 20a-20h in this example form a composite part 20. The first layer 20a is formed on a substrate 22, and each subsequent material layer is formed on the previously formed material layer. Thus, layer 20b is formed on layer 20a, layer 20c is formed on layer 20b, and so forth. In this example different shading is used to indicate that the layers 20a-20h may be comprised of different materials. For example, layer 20a may be comprised of copper, layers 20b-20e may be comprised of plastic, layer 20g may be comprised of tantalum, and layer 20h may be comprised of gold. Virtually any type of material that is able to be supplied in powdered form and which is meltable by a heat source may potentially be used to form one or more layers of the composite part 20. Alternatively, all of the layers 20a-20h may be made from the same material. However, as will be explained more fully in the following paragraphs, it is expected that the use of the HVLAD process in forming one or more layers will make forming composite parts highly desirable, and will enable a finished part to be produced that has a plurality of different material characteristics, or at least which has portions thereof that have different material characteristics. For example, one or more portions of the finished part 20 may be electrically conductive, while other portions are electrically insulating. Also, one or more layers/portions of the finished part 20 may be formed with materials that provide specific and defined thermally or electrically conductive paths or channels through the entire part 20.

Referring further to FIG. 2, in practice the AM subsystem 12 may be used to form one or more material layers on the substrate 22. Then either the laser peening subsystem 14 or the HVLAD subsystem 16 may be used. If the laser peening subsystem 14 is used, laser energy may be directed at all or portions of a surface of one of the material layers to significantly harden the entire material surface or only specific portions thereof, before proceeding further with the AM process or the HVLAD process. Or the HVLAD subsystem 16 may be used to deposit a new coating or material layer on the previously formed material layer. The HVLAD process is especially useful in depositing protective metal films and coatings.

Figure 3:
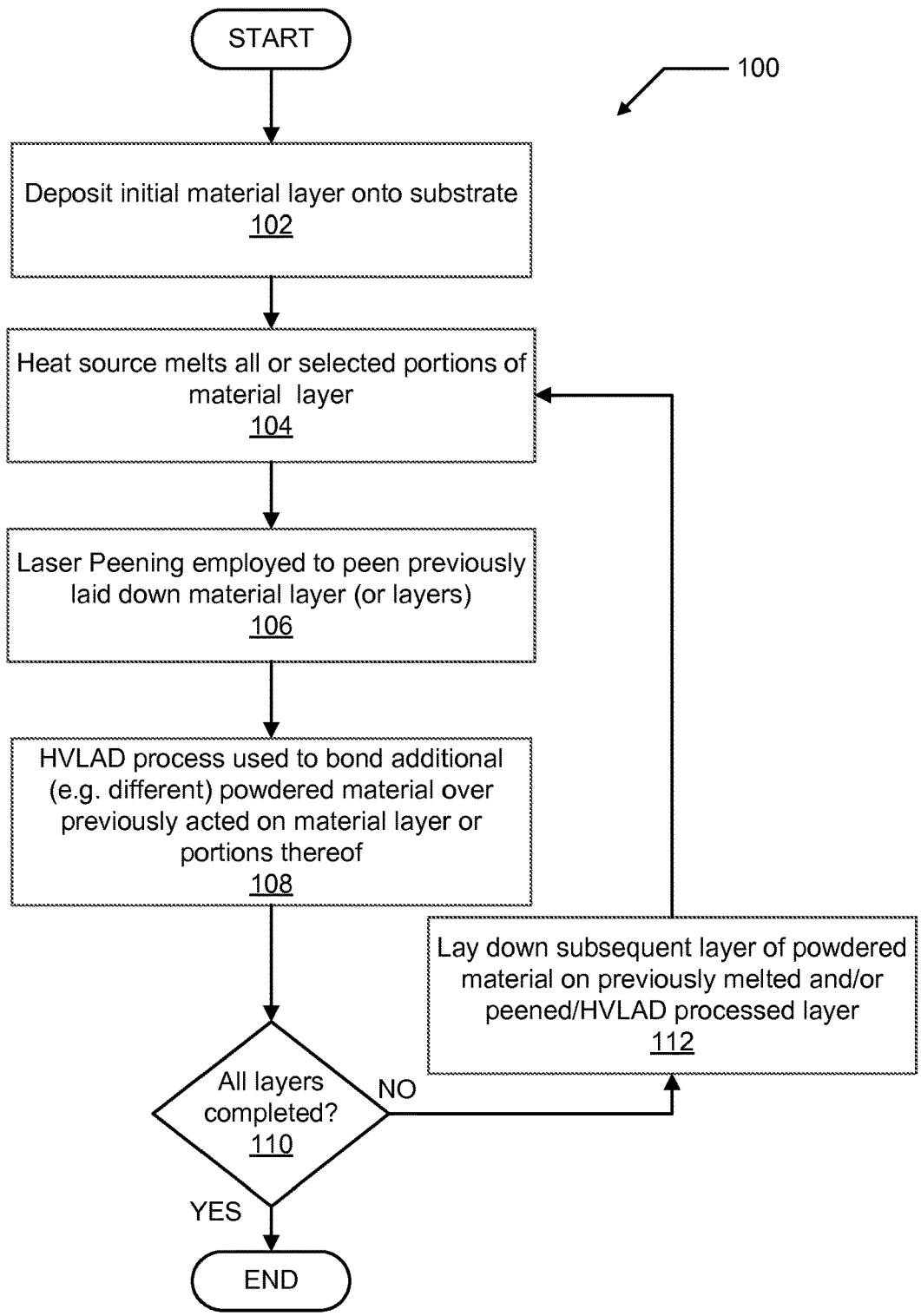
FIG. 3 is a high level flowchart illustrating one example of a sequence of operations that may be used to integrate both laser peening and the HVLAD process into an AM process.

Referring to FIG. 3, a flowchart 100 is shown illustrating a high level sequence of operations that may be performed using the AM subsystem 12, the laser peening subsystem 14 and the HVLAD subsystem 16. Again, however, it will be appreciated that the operations described in connection with FIG. 3 need not be performed in the exact order shown in the figure, and FIG. 3 is therefore meant to only present one example of how the use of the subsystems 12-16 may all be implemented to produce a composite part. At operation 102 an initial layer of powdered material is placed on the substrate (component 22 in FIG. 1). At operation 104 a heat source associated with the AM subsystem 12 is used to melt all or selected portions of the material layer. At operation 106 laser peening may be employed using the laser peening subsystem 14. At operation 108, the HVLAD process may be implemented using the HVLAD subsystem 16 to bond additional material onto the previously formed material layer. In this regard it will be appreciated that operations 108 and 106 could be reversed in order, or one or the other may be omitted. In other words, operations 106 and 108 may be used together or independently. Thus, an HVLAD operation need not be used with peening, but it could supplement the benefits of peening.

At operation 110 a determination is made if all the layers of the composite part have been formed. If not, then operations 104-108 may be repeated until the required number of layers has been formed.

The systems and methods described herein thus enable 3D composite parts to be formed with a plurality of distinct and diverse material characteristics, as a result of the use of one or both of the laser peening and HVLAD processes. One specific example is a part with high material strength and also improved conductivity beyond the base material used for the part. One way this could be accomplished is by using the HVLAD process to layer high conductivity materials, for example copper, gold, carbon nanotubes, etc., to provide conduction pathways for heat removal while the base material provides high strength. Thus, composite parts having built in electrically conductive paths or electrically conductive characteristics, thermally conductive paths or characteristics, excellent hardness and other characteristics can be produced. As another example, to improve strength in a steel part, tungsten foil could be layered in the steel using the HVLAD process, during the overall AM process, to create a 3D steel-tungsten composite part without alloying or eutectic formation. Similarly, a light-weight aluminum part could be strengthened by intermingling higher strength materials like steel or refractory alloys into a metal composite part. HVLAD may potentially with used with a host of other materials, for example and without limitation, tantalum and nickel.

Another example may be the production of composite parts having materials designed for high strength and radiation resistance for fusion power plant or other high neutron radiation environments. By using oxide dispersion strengthened (ODS) steel coupled with silicon carbide (SiC), graphite or other high conducting material, a composite part may be developed that has both high strength and high conductivity material that could survive decades in extreme fusion radiation environments. Other materials of interest could include cobalt-chromium alloys, low-alloy steels, nickel alloys, tool steels, stainless steels, ferritic martensitic steels, aluminum alloys, brass, bronze and other metals.

Three dimensional composite parts may thus be tailored, through the use of selected materials and the selective use of the laser peening and HVLAD processes, to even better meet the requirements, needs and/or environment in which the part will be used. The combined use of the AM process, the laser peening process and the HVLAD process will enable parts to be produced with specific, diverse performance characteristics that would be difficult, impracticable or impossible to produce with other manufacturing technologies. Similar to other composite systems (rebar-concrete) a tensile strength material could be applied via HVLAD while a lightweight low tensile strength material comprises the bulk. The mixing of material layers in 3D could allow for limitless customization.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for manufacturing a three dimensional part through at least two distinct manufacturing processes, the method comprising:
    laying down a plurality of distinct material layers layered one on top of another, through an additive manufacturing process which forms a first manufacturing method;
    forming a three dimensional part from the plurality of distinct material layers using the additive manufacturing process, the additive manufacturing process encompassing laying down a first layer of material and performing a heating operation to solidify all or portions of the layer of material, and then forming one or more additional material layers in a similar fashion;
    laser peening at least one of a selected subquantity of the plurality of distinct material layers before laying down a subsequent one of the plurality of distinct material layers, to impart improved hardness to at least one of the selected subquantity of the plurality of distinct material layers; and
    bonding a new, different quantity of material to the laid down one of the material layers by a High Velocity Laser Accelerated Deposition (HVLAD) process forming a second manufacturing method, to form a new, different material layer, to a previously laid down one of the plurality of distinct material layers, the HVLAD formed new, different layer of material having a differing electrical conductance from the plurality of layers formed using the additive manufacturing process.

2. The method of claim 1, further comprising performing a laser peening operation on a surface of an intermediate one of the selected subquantity of the plurality of distinct material layers.

3. The method of claim 1, wherein the plurality of distinct material layers comprises at least one of:
    gold;
    plastic;
    tantalum;
    copper;
    steel alloys;
    aluminum alloys;
    tungsten;
    oxide dispersion strengthened steel (ODS);
    silicon carbide; and
    graphite.

4. The method of claim 3, wherein plurality of distinct material layers comprise a plurality of gold, plastic, tantalum, copper, steel, oxide dispersion strengthened steel (ODS), silicon carbide and graphite.

5. The method of claim 1, wherein the forming a three dimensional part includes heating the plurality of distinct material layers with a laser diode subsystem.

6. The method of claim 1, wherein the operation of bonding a new, different quantity of material to the laid down one of the material layers using an HVLAD process comprises only bonding a new different quantity of material to one or more selected subportions of a previously laid down one of the plurality of distinct material layers, using the HVLAD process.

7. A method for manufacturing a three dimensional part, using two distinct manufacturing processes, the method comprising:
    laying down a first material layer through an additive manufacturing process forming a first manufacturing method, the additive manufacturing process including performing a heating operation to solidify all or portions of the first layer, and then forming one or more additional material layers in a similar fashion;

laying down a second material layer onto the first material layer to form the three dimensional part with the first manufacturing method; and bonding a new quantity of material using a second manufacturing method, to form a third, different material layer, from material different from that used for the previously laid down one of the first or second material layers, the second manufacturing method including a High Velocity Laser Accelerated Deposition (HVLAD) process, the third, different material layer providing an electrical conductivity that is different from first and second material layers.

8. The method of claim 7, wherein the bonding of a new quantity of material to form the third, different material layer comprises bonding the new quantity of material to only a selected portion of the previously laid down one of the first or second material layers.

9. The method of claim 7, further comprising directing a laser beam from a laser peening subsystem on a selected subquantity of the first and second material layers, to laser peen the selected subquantity of the first and second material layers and thus to impart improved hardness to the selected subquantity of the first and second material layers.

10. The method of claim 7, wherein forming the three dimensional part comprises forming at least one of the first and second material layers with at least one of:

gold;
plastic;
tantalum;
copper;
steel alloys;
aluminum alloys;
tungsten;
oxide dispersion strengthened steel (ODS);
silicon carbide; and
graphite.

* * * * *